United States Patent

[11] 3,602,421

| [72] | Inventor | Stephen A. Spratt, Jr.<br>Brookfield, Conn. |
|---|---|---|
| [21] | Appl. No. | 841,092 |
| [22] | Filed | July 11, 1969 |
| [45] | Patented | Aug. 31, 1971 |
| [73] | Assignee | Branson Instruments, Incorporated<br>Stamford, Conn. |

[54] SONIC WELDING TOOL
10 Claims, 2 Drawing Figs.

[52] U.S. Cl. .................................................. 228/1,
29/470.3, 32/1, 156/73, 156/580
[51] Int. Cl. ................................................ B23k 1/06,
B23k 5/20
[50] Field of Search ................................... 228/1;
29/470.3, 470.1; 156/73; 72/359; 156/580; 32/1,
26

[56] References Cited
UNITED STATES PATENTS

| 2,990,616 | 7/1961 | Balamuth et al. | 32/26 |
| 3,201,967 | 8/1965 | Balmuth et al. | 72/359 |
| 3,279,067 | 10/1966 | Hoffman | 156/73 X |
| 3,429,028 | 2/1969 | Marpois et al. | 29/470.1 |
| 3,468,731 | 9/1969 | Obeda | 228/1 X |
| 3,158,928 | 12/1964 | Prisco et al. | 29/470.1 |

Primary Examiner—John F. Campbell
Assistant Examiner—R. J. Craig
Attorney—Ervin B. Steinberg ABSTRACT: A portable ultrasonic welding tool is fitted with a set of handles and a clamped-on device having a movable member which, responsive to fluid pressure, can be brought toward the frontal end of the tool for engaging a workpiece to which sonic energy is transferred whereby this member acts as anvil.

INVENTOR.
STEPHEN A. SPRATT JR.
BY:
Erwin B. Steinberg

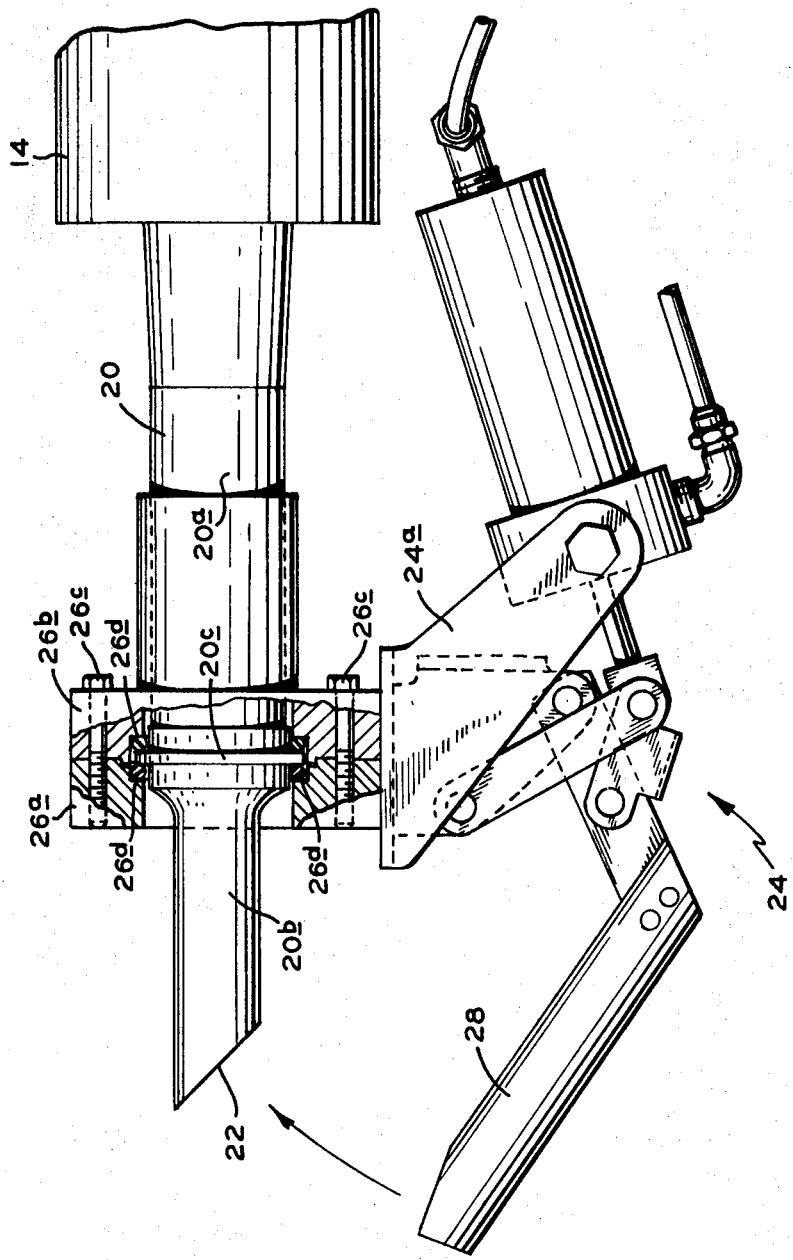

SONIC WELDING TOOL

This invention relates to a sonic welding tool and more specifically has reference to a sonic welding tool for welding or sealing thermoplastic parts or films by sonic energy, preferably energy in the ultrasonic frequency range.

Apparatus for assembling and welding thermoplastic parts by sonic or ultrasonic energy are well described in the literature, see for instance "Using Ultrasonics to Assemble Plastic Parts" by Edward G. Obeda, Automation (magazine) Nov. 1967, pages 78–82, or U.S. Pat. No. 3,224,916 dated Dec. 21, 1965, entitled "Sonic Method of Welding Thermoplastic Parts" issued to R. S. Soloff.

Two parts to be joined by ultrasonic energy generally are disposed between a stationary support, or anvil, and a source of ultrasonic energy. Responsive to the energization of the source, ultrasonic energy is applied to the workpiece and dissipated therein, to cause, for instance, a fusion joint along an interface between two mating members. The source of ultrasonic energy comprises most commonly a high frequency electrical generator and a converter unit which has a piezoelectric or a magnetostrictive transducer for converting the electrical energy supplied by the generator to mechanical vibrations. A typical converter unit using piezoelectric transducer means is shown in U.S. Pat. No. 3,328,610 issued to S. E. Jacke et al. on June 27, 1967 entitled "Sonic Wave Generator." The converter unit usually is fitted with a mechanical impedance transformer, also known as solid acoustic horn, for amplifying the mechanical vibrations provided by the transducer means. The horn forms the coupling member between the transducer means and the workpiece.

The present invention relates specifically to a sonic or ultrasonic converter unit which is provided with a movable member which during the sonic energy transfer serves as the anvil supporting the workpiece, thereby obviating the need for a separate anvil. The apparatus disclosed hereafter is a unitary welding tool providing acoustic energy in the sonic or ultrasonic frequency range and is adapted, moreover, to be brought to a work station where two pieces to be joined can be clamped between the frontal surface of the horn and the anvil forming a part of the tool, the anvil being adapted to be brought into and out of engagement with the workpiece.

One of the principal objects of this invention is, therefore, the provision of a new and improved tool providing energy in the sonic or ultrasonic frequency range and which is adapted for assembling workpieces by the use of such energy.

Another important object of this invention is the provision of an ultrasonic welding tool having an anvil which selectively can be brought into and out of engagement with a workpiece to be assembled by means of ultrasonic energy available from the tool.

A further object of this invention is the provision of an ultrasonic assembly tool which includes, as a part thereof, a movable member adapted to be swung against the frontal surface of a horn forming a part of the tool, and the tool including means for urging the member against such frontal surface while a workpiece is interposed between the frontal surface and such member.

Further and still other objects of this invention will become more clearly apparent by reference to the following description when taken in conjunction with the accompanying drawings in which:

FIG. 2 is an elevational view, partly in section, of certain portions of FIG. 1.

Figure 1:
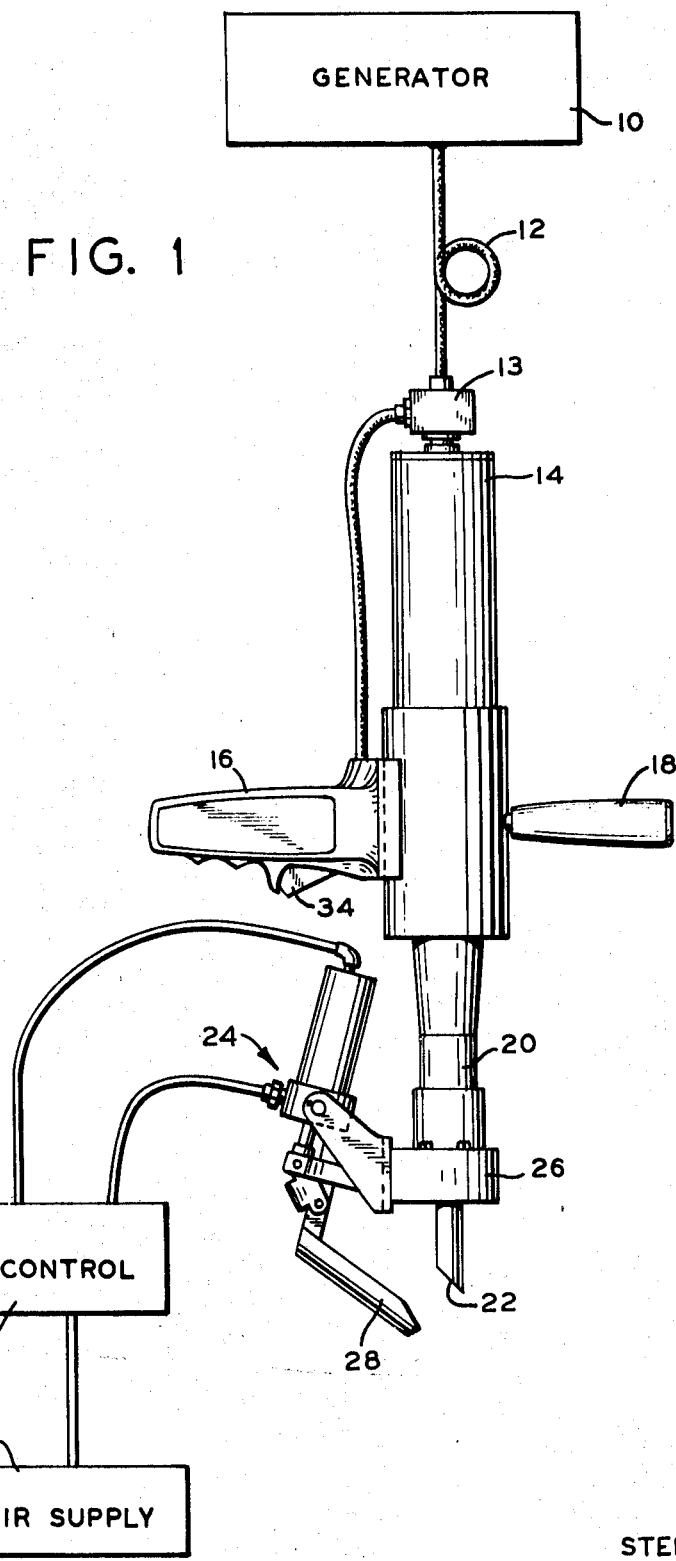
FIG. 1 is a schematic illustration of the present invention.

Referring now to the figures and FIG. 1 in particular, numeral 10 identifies an electrical high frequency generator which provides electrical energy, typically having a frequency of 20 kHz., via a cable 12 and a junction box 13 to a converter unit 14. The converter unit is of conventional design and includes either piezoelectric or magnetostrictive means (not shown) for converting the electrical energy applied to acoustic vibrations. Typically, the converter unit is constructed as shown in detail in U.S. Pat. No. 3,328,610 supra. The converter unit is fitted with a mechanical impedance transformer 20, also known as a solid horn, for providing increased mechanical vibrations at the frontal end 22 which is brought into contact with workpieces to which the sonic or ultrasonic energy is applied. The horn may be of several shapes, such as conical, exponential or catenoidal form, and the length is dimensioned so that the frontal surface 22 is located at an antinodal zone when the horn is resonating along its longitudinal axis. For specific details with regard to the design and dimensioning of solid horns, reference is made to the book entitled "Ultrasonic Engineering" by Julian R. Frederick, John Wiley & Sons, Inc., New York, (1965) pages 87–98.

The converter unit 14 is fitted with a set of handles 16 and 18 in order to render the converter unit portable and use it as a tool which can be brought to a work station for assembling and welding large workpieces. A fluid pressure responsive actuating device 24 having a pivotally mounted member 28 is fastened to the horn 20 by bracket means 26. Most suitably, such fastening is accomplished at a nodal zone of the horn 20 where there is substantially no motion of the horn along its longitudinal axis. The actuating device 24 is coupled to a supply of fluid, such as a supply of air 32, and an interposed control unit 30. The pivotally mounted member 28 is made of metal to serve as an anvil which supports the underside of the workpiece during the time the frontal surface 22 of the horn is in contact with the workpiece and transfers acoustic energy thereto.

Responsive to the operation of the control means 30, for instance, a four-way solenoid valve with suitable actuating means, such as a foot switch, the pivotally mounted member 28 can be moved toward and away from the frontal surface 22 of the horn and while the member 28 is swung toward the horn, the fluid pressure effective on the actuating mechanism urges the anvil member 28 against the underside of the horn or against the workpiece interposed between the frontal surface 22 and the member 28. A trigger switch 34 is mounted to the handle 16 and is operable to cause actuation of the generator 10 for providing the transfer of sonic or ultrasonic energy from the converter unit 14 to the workpiece.

The mounting of the device 24 to the converter unit and specifically to the horn 20 is shown more clearly in FIG. 2. The horn has a rear section 20a, a front or output section 20b, and a radial flange 20c, the latter being located at a nodal region of the horn. A clamp 26 comprises two members 26a and 26b which straddle the flange 20c. A set of resilient O-ring gaskets 26d cause the clamp to be acoustically decoupled from the horn. The members 26a and 26b are tightened against each other by a set of screwbolts 26c. The fluid-operated actuating device is mounted to the members 26a and 26b by means of a bracket 24a and a set of suitable screws. Thus, the device 24 and anvil member 28 are isolated from the horn and do not affect the loading of the horn.

The fluid pressure responsive device is a toggle mechanism which includes a cylinder and piston for providing the required reciprocating motion. Typically, it is a commercial device, such as is available from the Vlier Engineering Corporation, a division of Barry Wright Corporation, Los Angeles, Cal., under part No. Vlier/Wespo 97201. The piston is driven in reciprocating motion by pressurized gas, typically compressed air. As is obvious to those skilled in the art, other and similar mechanisms can be substituted without deviating from the principle of the present invention.

It will readily be apparent that the welding tool disclosed heretofore can be brought, for instance, to architectural wall panels made of thermoplastic materials, and the panels can be spotwelded in situ. In other instances, the tool can be brought to large thermoplastic sections forming a part of an automobile body and, once again, the welding or fastening operation can be accomplished with ease and great facility.

What is claimed is:

1. A sonic welding tool comprising:
an electroacoustic converter for receiving electrical energy and providing sonic energy and including a mechanical impedance transformer having a free end adapted to engage a workpiece to which sonic energy is to be transferred, said impedance transformer being dimensioned to be resonant along its longitudinal axis at its operating frequency;
means having a pivotally mounted member adapted to serve as an anvil coupled to said converter; and
control means coupled to said means having said member for selectively moving said member toward and away from said free end whereby a workpiece may be clamped between said free end and said member, said member acting as an anvil when sonic energy from said free end is transferred to a workpiece.

2. A sonic welding tool as set forth in claim 1, said converter operating in the ultrasonic frequency range.

3. A sonic welding tool comprising:
an electroacoustic converter for receiving electrical energy and providing sonic energy and including a mechanical impedance transformer having a free end adapted to engage a workpiece to which sonic energy is to be transferred, said impedance transformer being dimensioned to be resonant along its longitudinal axis at its operating frequency;
fluid pressure responsive means having a pivotally mounted member adapted to serve as an anvil coupled to said converter; and
control means coupled to said fluid pressure responsive means for selectively moving said member toward and away from said free end whereby a workpiece may be clamped between said free end and said member, said member acting as an anvil when sonic energy from said free end is transferred to a workpiece.

4. A sonic welding tool comprising:
an electroacoustic converter for receiving electrical energy and providing sonic energy and including a mechanical impedance transformer having a free end adapted to engage a workpiece to which sonic energy is to be transferred, said impedance transformer being dimensioned to be resonant along its longitudinal axis at its operating frequency;
means having a pivotally mounted member adapted to serve as an anvil coupled to said impedance transformer at a nodal zone thereof; and
control means coupled to said means having said member for selectively moving said member toward and away from said free end whereby a workpiece may be clamped between said free end and said member, said member acting as an anvil when sonic energy from said free end is transferred to a workpiece.

5. A sonic welding tool comprising:
an electroacoustic converter for receiving electrical high frequency energy and providing sonic energy in the ultrasonic frequency range and including a mechanical impedance transformer having a free end adapted to engage a workpiece to which sonic energy is to be transferred, said impedance transformer being dimensioned to be resonant along its longitudinal axis at its operating ultrasonic frequency;
fluid pressure responsive means having a pivotally mounted metal member adapted to serve as an anvil coupled to said converter;
control means coupled to said fluid pressure responsive means for selectively moving said metal member toward and away from said free end whereby a workpiece may be clamped between said free end and said metal member, said metal member acting as an anvil when sonic energy from said free end is transferred to a workpiece, and
a set of handles disposed on said converter for rendering said welding tool portable.

6. An ultrasonic welding tool comprising:
an electroacoustic converter for receiving electrical energy and providing ultrasonic energy and including a mechanical impedance transformer having a free end adapted to engage a workpiece to which ultrasonic energy is to be transferred, said impedance transformer being dimensioned to be resonant along its longitudinal axis at its operating frequency;
a clamp mounted to said impedance transformer substantially at a nodal region thereof;
acoustic decoupling means disposed between said impedance transformer and clamp;
fluid-operated actuating means having a pivotally mounted member coupled to said clamp, said member adapted to serve as anvil; and
control means coupled to said fluid-operated actuating means for selectively moving said member toward and away from said free end of said impedance transformer whereby a workpiece may be clamped between said free end and said member, said member acting as an anvil when ultrasonic energy from said free end is transferred to a workpiece.

7. An ultrasonic welding tool as set forth in claim 6, said impedance transformer horn being provided with a radial flange, said clamp comprising a pair of members straddling said flange and fastened together by screw means.

8. An ultrasonic welding tool as set forth in claim 7, said acoustic decoupling means comprising a set of O-rings disposed at either side of said radial flange.

9. An ultrasonic welding tool as set forth in claim 6, said fluid-operated actuating means being operated responsive to gas pressure.

10. An ultrasonic welding tool comprising:
an electroacoustic converter for receiving electrical energy and providing ultrasonic energy and including a mechanical impedance transformer having a free end adapted to engage a workpiece to which ultrasonic energy is to be transferred, said impedance transformer being dimensioned to be resonant along its longitudinal axis at its operating frequency;
a clamp mounted to said impedance transformer horn substantially at a nodal region thereof;
acoustic decoupling means disposed between said impedance transformer clamp;
fluid-operated actuating means having a member adapted to serve as anvil coupled to said clamp; and
control means coupled to said fluid-operated actuating means for selectively moving said member toward and away from said free end of said impedance transformer horn whereby a workpiece may be clamped between said free end and said member, said member acting as an anvil when ultrasonic energy from said free end is transferred to a workpiece.

PO-1050
(5/69)

UNITED STATES PATENT OFFICE
CERTIFICATE OF CORRECTION

Patent No. 3,602,421          Dated August 31, 1971

Inventor(s) STEPHEN A. SPRATT, Jr.

It is certified that error appears in the above-identified patent and that said Letters Patent are hereby corrected as shown below:

Column 4, line 50, cancel word "horn";

line 59, cancel word "horn"

Signed and sealed this 4th day of January 1972.

(SEAL)
Attest:

EDWARD M. FLETCHER, JR.          ROBERT GOTTSCHALK
Attesting Officer          Acting Commissioner of Patents